May 6, 1958 G. A. HARRIS 2,833,940
TIME CYCLE CONTROLLER
Filed Jan. 29, 1957 3 Sheets-Sheet 3

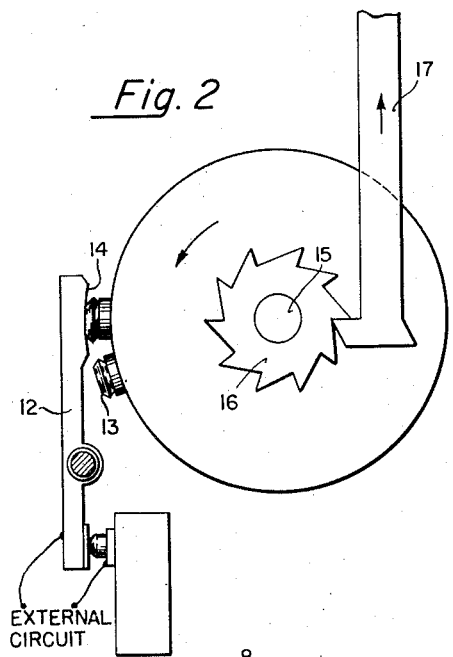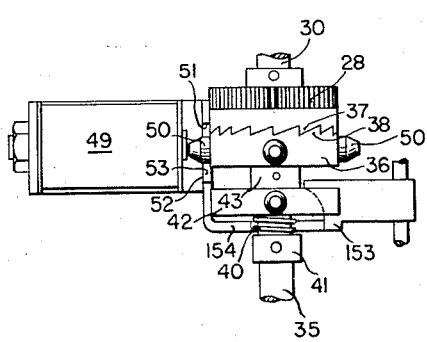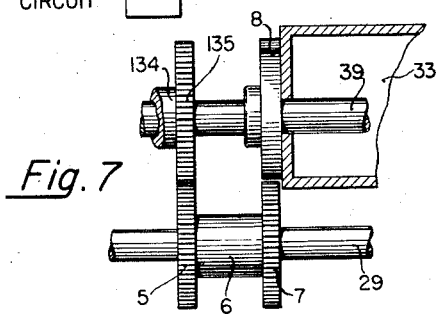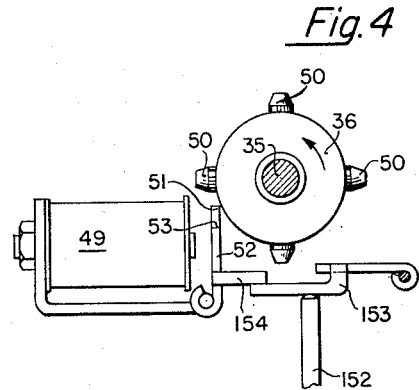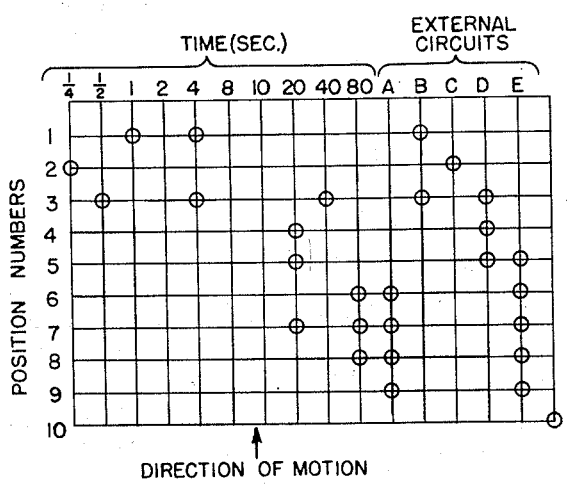

INVENTOR.
GEORGE A. HARRIS
BY
AGENT ically
United States Patent Office 2,833,940
Patented May 6, 1958

2,833,940

TIME CYCLE CONTROLLER

George A. Harris, Malvern, Pa.

Application January 29, 1957, Serial No. 636,893

22 Claims. (Cl. 307—112)

The present invention relates to controllers and more particularly to apparatus for selecting circuits to operate certain machines or other mechanisms simultaneously and/or sequentially and for timing their operation.

It is an object of the invention to provide a control apparatus which is extremely versatile, rugged and easily changed from one selected cycle of operation to another.

Another object of the invention is to provide a sequence control system wherein time control cycles are provided which are particularly adapted for binary code systems but may also be operative for other systems.

A further object is to provide means for the simultaneous selection of operating and timing circuits.

A still further object is to provide means for varying a preset arrangement of electric circuits under control of selected time circuits according to a predetermined pattern of operations.

More specifically, an object is to provide a preset sequence control apparatus including means forming two areas of control, one of which has a predetermined control of external program operating circuits and the other of which has a predetermined time cycle control relating to the external control program and functioning at the completion of a time cycle to initiate another selected circuit operation and its time cycle.

Briefly described, and in accordance with an illustrated embodiment of the invention, there is provided a rotatable master control drum for selecting the operation, and sequence of operation, of external machines, processes, apparatus, and the like, and for selecting the time periods during which such mechanisms are to continue in operation.

The drum is provided in its periphery with removable pegs which are preinserted therein in accordance with a desired sequence of operations and their related time periods. The pegs are inserted into two areas of the drum, one of which is associated with a group of switches for operating external machines, and the other of which is associated with a group of time switches for selecting an internal circuit in accordance with a definite time period of operation. The master control drum is indexed to a new position at the end of each time cycle, so that a different set of pegs will be brought into operating position to close its associated switches for a new cycle operation.

In order to determine the duration of each time cycle, there is provided a group of rotatable cylindrical counters, each counter having its periphery formed with a plurality of conductive areas. The time switches are set, by appropriate pegs in the master control drum, to be brought into a series circuit with a predetermined group of conductive areas on each of the counters, the particular combination of conductive areas being determined by the time cycle desired. In order to bring the operative conductive areas of the counters into a series circuit relationship with the time switches, one or more counters, depending upon the time cycle selected, is caused to rotate in angular increments each of which represents a definite time interval until the appropriate conductive areas are brought into series circuit. When this condition is reached at the end of a time cycle, the time switches and counters will be in series circuit with a reset mechanism so that a current from a source of voltage will pass through the time switches and counters to actuate the reset mechanism. The reset mechanism causes the counters to be returned to zero or starting position, and the master control drum to be indexed to the next cycle of operation.

In the accompanying drawings:

Fig. 2 is a detail view in end elevation of the control drum as related to the circuit switches;

Fig. 3 is a detail view in plan of the time control unit;

Fig. 4 is a detail view in end elevation of the reset control unit;

Fig. 5 is a schematic developed view of the control drum surface with selected pegs in place for time control selected external circuits;

Fig. 7 is a fragmentary view of a portion of the drive mechanism.

Figure 1:
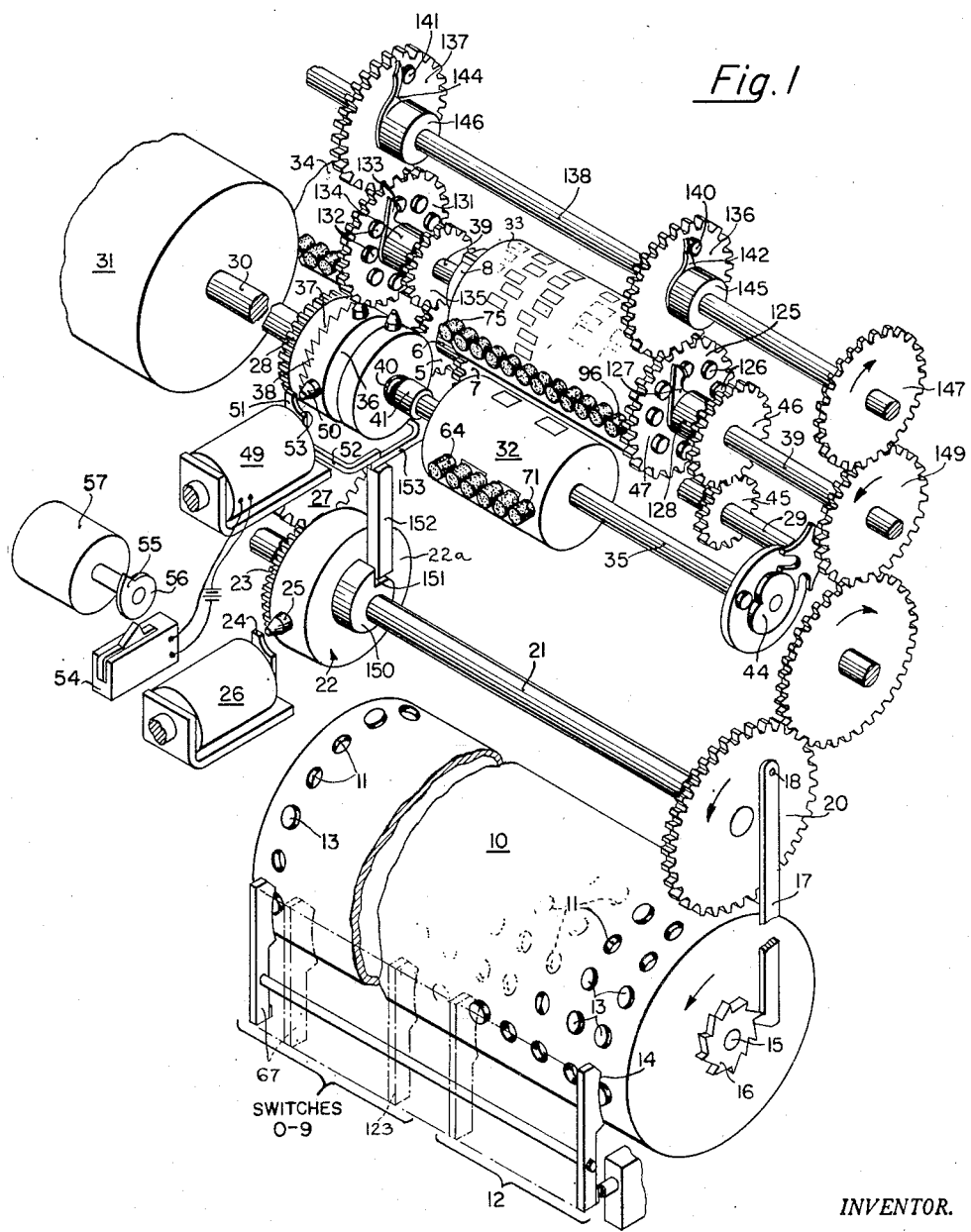
Fig. 1 is a schematic isometric view of a mechanism embodying the invention.

Referring to the drawings and initially to Fig. 1 thereof, a rotatable drum 10 provides a master control means for closing selected external circuits according to a predetermined program and maintaining such circuits closed for selected time periods. These external circuits may be used to operate one or more electrically operated machines, valves or other devices not shown. The periphery of drum 10 is formed with lengthwise or axially disposed rows of holes 11, in generally parallel spaced apart relation in intervals related both to external switch mechanism and time switch mechanism. The rows of holes 11 are also aligned to form a plurality of circumferentially disposed rows. In the present instance, and as seen in Fig. 5, the holes are arranged in two groups. As indicated in Fig. 5 one group includes five circumferential rows of holes arranged in alined juxtaposed relation to five switches 12 (Fig. 1) each switch controlling the opening and closing of one external circuit. The other group comprises ten circumferential rows of holes respectively alined in juxtaposed relation to switches identified in Fig. 6 by reference numerals 0 to 9. These latter switches are part of a binary system for controlling time circuits, not shown.

In order to select the switches to be closed in both the external circuits and the time circuits, a plurality of pins or pegs 13 are inserted in holes 11 according to a selected sequence of operations, such pegs 13 when inserted projecting respectively to close any switch which is in its path of movement when the drum is moved from one linear row to another at the end of each time cycle. Furthermore, in connection with the switches for the respective external circuits, it can be noted from Fig. 2 that the actuator arm of each switch 12 is provided with a pin contact surface 14 of a length sufficient to bridge two adjacent pegs 13 of the same circumferential row in order to hold a particular switch closed as the drum indexes from one position to another. Thus by inserting additional adjacent pegs in any circumferential row its associated external circuit may be continued in operation for additional time cycles. Also in this connection it should be understood that the number of holes in a circumferential row is only limited by the diameter of the drum and no specific number is important so far as the broad concepts of the invention are concerned.

Figure 6:
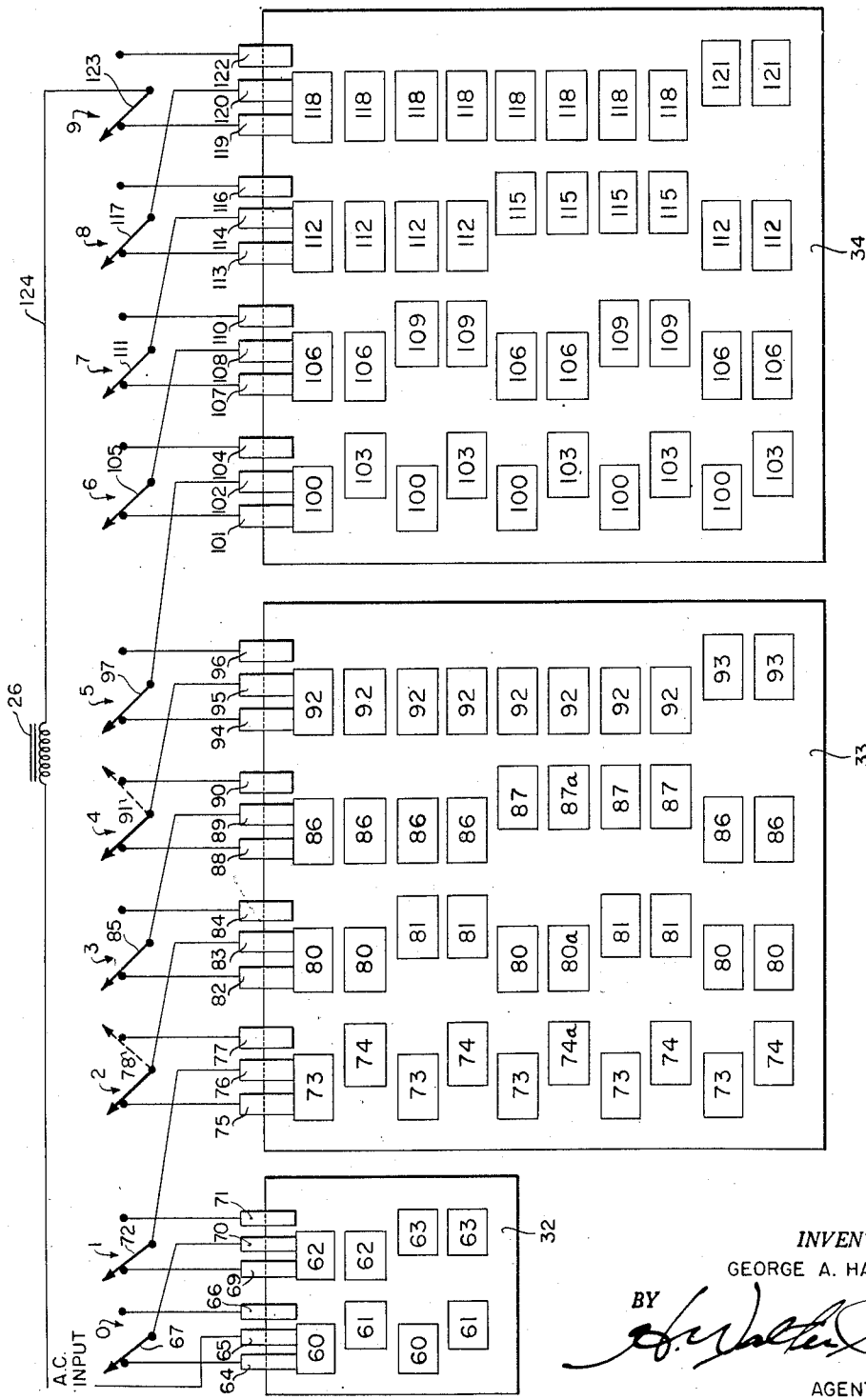
Fig. 6 is a view showing a schematic development of the surfaces of the time controlling counters and their associated switch contacts.

As seen in Figs. 1 and 2, drum 10 is mounted upon a shaft 15 for step-by-step operation to index the linear rows of pre-set pegs, relative to the switches. Shaft 15 carries a ratchet wheel 16 arranged to be stepped by a pawl 17 pivotally suspended from a pin 18 eccentrically attached to a gear 20 keyed to a time controlled shaft 21. The shaft 21 is arranged to be intermittently rotated at the proper time with relation to the switch closing time by means of a clutch, such as friction clutch 22 including a disc 22a keyed to shaft 21 and a driving gear 23 journalled on shaft 21. When the timing switches are open, disc 22 is held stationary by an arm 24, which when in holding position, is in the path of movement of a pin 25 projecting from the periphery of disc 22. Arm 24 is the armature of a reset solenoid 26, which, when energized at the time for indexing drum 10, retracts arm 24 to release disc 22 to the torque frictionally transmitted thereto by driving gear 23. This latter gear is continuously rotated through the medium of an idler gear 27 in mesh with driving gear 28 which is keyed to the main shaft 30 and driven by an induction motor 31 or the like. The reset solenoid 26 is included in series circuit with the timing or counting switches 0 to 9 as shown in Fig. 6 and more fully described later.

For the purpose of regulating the time a selected external switch 12 is to be closed for the operation of a machine or other device, a plurality of time control counters 32, 33 and 34 (Figure 1) are provided and arranged for sequential interconnection according to the desired selected control times. In the present instance counter 32 is to be rotated one-quarter of a revolution each quarter-second; counter 33 one-tenth of a revolution each second; and counter 34 one-tenth of a revolution each ten seconds. Thus counter 32 makes one revolution in one second, counter 33 makes one revolution in ten seconds, and counter 34 makes one revolution in one hundred seconds. As here shown counter 32 is keyed to a shaft 35 alined with main shaft 30 through an interposed unidirectionable clutch including driving gear 28 and an axially shiftable disc 36 for declutching purposes.

The present clutch construction, as more clearly shown in Fig. 3, includes circumferential teeth 37 on gear 28 coacting with mating circumferential teeth 38 on the opposed face of driven clutch disc 36. The arrangement is such that when disc 36 is in clutching relation with gear 28, the meshing teeth transmit motion from shaft 30 to shaft 35 for unidirectional drive. Clutch disc 36 is biased to clutching position by a compression spring 40, which is compressed between a collar 41 fixed to shaft 35 and a reset disc 42 keyed for axial sliding on shaft 35. This biasing action is transmitted to clutch disc 36 by a collar 43 which is attached thereto and to disc 42, and which is slidable on shaft 35, the biasing action holding the clutch engaged to rotate counter 32.

When the counting is to continue to counter 33, provision is made for this by extending shaft 35 beyond the counter to terminate in a Geneva movement 44 by means of which one revolution of counter 32 is transmitted by pinion 45 on shaft 29 to a gear 46 which is journalled on a fixed shaft 39 upon which both counters 33 and 34 are also journalled. The motion transmitting means for counters 33 and 34 will be later described in connection with the reset mechanism with which each is related. When the counting is to continue beyond the ten seconds of counter 33, the turning of the latter is transferred to counter 34 by suitable intermittent gearing comprising gears 7 and 8 (Fig. 7). As a result of the foregoing construction and with the timing switches arranged in a binary system it is possible to provide timed cycles of ¼ second to 99¾ seconds duration in ¼ second intervals.

In order to produce the ¼ second operation of counter 32, means are provided for declutching disc 36 after each quarter turn of shaft 35, such means comprising four timing stop pins 50 projecting in this instance, from the periphery of disc 36, at ninety degree spacing to travel in an arc to intercept a cam 51 which is formed as a part of a pivoted armature 52 of a timing solenoid 49. The cam 51 terminates in a stop ledge 53 located in the path of pins 50, whereby when cam 51 retracts clutch disc 36, the particular pin engaged by the stop ledge 53 brings shaft 35 to a stop. The solenoid 49 is included in a timing circuit arranged to be closed by pulses generated each quarter-second as a result of the closing of switch 54 by means of the high point 55 on cam 56 rotated by means of a directly connected synchronous timing motor 57, thereby closing the solenoid circuit each quarter-second in order to permit counter shaft 35 to be rotated at the selected ¼ second intervals. Thus, each time timing solenoid 49 is energized, its armature 52 is retracted to release movable clutch disc 36 to the bias of spring 40 whereby the clutch operates to turn shaft 35 and counter 32 through the one quarter second interval.

For utilizing counters 32, 33 and 34 as controls for timing the closed condition of external circuits, each counter is in the form of a cylinder having its peripheral surface provided with rows of circuit bridging contact terminals, the rows being arranged circumferentially and spaced to provide a plurality of index positions from which the making or breaking of any of a plurality of external circuits can be time controlled. Closing of the external circuits takes place selectively by pre-inserted pegs 13 in holes 11 whereby selected switches are closed and opened when the drum is indexed step-by-step from one index position to another. In this connection, it should be noted that the three counters 32, 33 and 34, either singly or cooperatively control the circumferential index time positions so each time position has a switch arranged to shift the sequence circuit from one circumferential time control row to the next adjacent row. For control by the ¼ second counter 32, reference may be had to Fig. 6, which shows a development of the counter periphery and shows a pair of circumferential rows of bridging contacts 60 and 61, representing a ¼ second position on the counter, with the contacts being linearly staggered for selection of a desired time circuit. The selection of the circuit or circuits to be closed by these terminal contacts is by way of three conducting brushes arranged linearly along the face of the counter to be engaged by a passing bridging contact of the counter 32. These brushes form the three terminals 64, 65, 66 of a double pole switch 67 corresponding to "0" which is arranged to be shifted by a peg or pin in drum 10 to select one or the other of the ¼-second rows. For this selection, the row of contacts 60 travels in a path to bridge the voltage input terminal 65 from the voltage source with terminal 64 in one situation, while the row of contacts 61 is arranged to travel in a path to bridge the input terminal 65 with the terminal 66 in a second situation. Similarly, three other brushes forming the three terminals 69, 70 and 71 of another double pole switch 72 corresponding to "1," are arranged to be shifted by a peg in drum 10 to select one or the other of a pair of ½-second rows. For this selection, the row of bridging contacts 62 travels in a path to bridge the input terminal 70 with the terminal 69 in one switch position, while the row of contacts 63 travels in a path to bridge the input terminal 70 with the terminal 71 in another switch position. When no peg is located for selection purposes, both switches 67 and 72 are positioned as shown in Fig. 6, so that contacts 60 and 62 are in series for that index position of the counter, and since there is no quarter-second time selection, in this instance, the current travels from counter 32, to time control counters 33 and 34 in series and cause an index turn of drum 10 provided no time had been set in these last counters. On the other hand, if a peg is placed in the first ¼ second hole of the drum, then switch 67 will be moved by the peg so that a bridge contact of row 61 will bridge the terminals 65 and 66. Consequently while the contacts of row 60 will bridge the terminals 64 and 65 that circuit is open at switch 67 and the output will be controlled by the first contact of row 61 for ¼ second timing as the counter turns to that contact position.

In order to provide time controls greater than one second, and in this instance, up to ninety-nine and three-quarters seconds, the two counters 33 and 34 function to that end by having pairs of circumferential rows of contacts arranged in spaced relation with one row of each pair linearly staggered with respect to the other as explained with reference to counter 32. In the case of counter 33, the row spacing is of the order of one second, while for counter 34 the row spacing is of the order of ten seconds.

Considering the developed surface of counter 33 shown in Fig. 6, there are four pairs of contact rows, successively arranged for one-second, two-second, four-second and eight-second time control, depending upon the time row or rows selected by one or more pegs inserted in the drum for the selection desired and in this instance functioning as a binary control. As described for the ¼ second counter 32, the circuit closing means for the counter 33 comprises a row of terminal brushes linearly disposed in such close proximity to the counter as to be selectively contacted by the counter contacts for circuit closing. Since there are four row pairs for this counter, there are twelve brushes, three for each row pair and with each row pair under control of a separate double pole switch. Specifically, the row of contacts 73 is registered to wipe only brush terminals 75 and 76 and the row of contacts 74 is registered to wipe only the brush terminals 76 and 77. The terminal 76 is the voltage input from switch 72 and the row selection is made by a double pole switch 78 to be actuated by a drum peg inserted in the drum for the desired row selection.

The pair of row contacts 80 and 81 are linearly staggered in two-second intervals, with the row contacts 80 registered to wipe only brush terminals 82 and 83 and the row contacts 81 registered to wipe only brush terminals 83 and 84. Terminal 83 is the voltage input from the switch 78 and the row selection is made by a double pole switch 85 to be actuated by a drum peg inserted in the drum for the desired row selection.

Considering the pair of row contacts 86 and 87 these are linearly staggered in four-second time intervals with the row of four contacts 86 registered to wipe only brush terminals 88 and 89 and the row of four contacts 87 registered to wipe only brush terminals 89 and 90. Brush terminal 89 in the input from switch 85 and the row selection is made by a double pole switch 91 to be actuated by a peg inserted in the drum for the desired row selection.

The last pair of contact rows 92 and 93 for counter 33 are linearly staggered in eight-second time intervals, namely, an alined circumferential row 92 of eight contacts and a linearly staggered row 93 of two contacts. The eight contact row 92 is registered to wipe only brush terminals 94 and 95 as the counter turns while likewise the two contact row 93 is registered to wipe only brush terminals 95 and 96. Brush terminal 95 is the input from the switch 91 and the row selection is made by a double pole switch 97 to be actuated by a peg inserted in the drum for the desired row selection.

The pattern of contacts for the counter 34 are arranged in the same row and staggered pattern as for the counter 33, except in this case the circumferential row spacing represents ten seconds instead of one second, and the staggered relation of the pairs of rows is respectively for ten, twenty, forty and eighty seconds. All of the contact rows are for coordinated registration with a row of brushes forming terminals respectively for selected time circuits, there being twelve such brushes arranged linearly along the face of the counter 34 to be engaged by a passing counter contact. Considering the ten-second pair of rows which adds from counter 32, the first circumferential row of contacts 100 is arranged in register with brush terminals 101 and 102. While the staggered row of contacts 103 is arranged to register with brush terminals 102 and 104, brush terminal 102 is the voltage input from the switch 97 and the row selection is made by a double pole switch 105 to be actuated by a peg inserted in the drum for the desired row selection.

Considering the twenty-second time pair of rows, the row of contacts 106 is arranged in register with brush terminals 107 and 108, while the staggered row of contacts 109 is arranged to register with the brush terminals 108 and 110. The brush terminal 108 is the input from switch 105 and the row selection is made by a double pole switch 111 to be actuated by a peg inserted in the drum for the desired row selection.

In a similar arrangement the forty-second time pair of rows has a row of contacts 112 arranged in register with the brush terminals 113 and 114, and the staggered row of contacts 115 is arranged in register with the brush terminals 114 and 116. Brush terminal 114 is the input from switch 111 and the row selection is made by a double pole switch 117 to be actuated by a peg inserted in the drum for the desired row selection.

For the final pair of contact rows, the row of eight contacts 118 is arranged in register with brush terminals 119 and 120 to wipe only these terminals as counter 34 turns while the row of two contacts 121 is arranged to register with the brush terminals 120 and 122 to wipe only these terminals as the counter turns. Brush terminal 120 is the voltage input from switch 117, and the row selection is made by a double pole switch 123 to be actuated by a peg inserted in drum 10 for the desired row selection. The output of the switch 123 leads by a conductor 124 to energize the reset solenoid 26 in the return to the source of voltage.

Since the reset mechanism is operatively connected to the motion transmitting means for counters 33 and 34, as seen in Fig. 1, the details of this motion mechanism will first be described. Counter 33 is attached to a gear 125 on one end, which gear 125 like counter 33 is free to turn on shaft 39 but receives a step-by-step rotation through a row of circumferential pins 126 projecting from the face of gear 125 into the path of a spring detent 127 radially carried by hub 128 of gear 46. Detent 127 is angularly disposed to drive any pin 126 engaged thereby but to permit pins 126 to ride past the detent 127 for resetting counter 33. As heretofore explained, counter 33 is rotated one-tenth of a revolution each second for each revolution of counter 32, by a step-by-step turning of gear 46 and consequently is rotated one revolution in ten seconds for each revolution of gear 46.

In a similar way counter 34 is fast to a gear 131 on one end, which gear 131 like counter 34 is free to turn on shaft 39 but receives a step-by-step rotation through a row of circumferential pins 132 projecting from the face of gear 131 into the path of a spring detent 133 radially carried by hub 134 of a gear 135 also freely rotatable on shaft 39. Gear 135 is driven from counter 33 by means of any well known intermittent motion unit (see Fig. 7) which turns gear 135 one tenth of a revolution for each revolution of counter 33. Detent 133 is radially disposed to drive any pin 132 engaged thereby but permits the pins to ride past the detent for resetting of counter 34. In the present instance the intermittent motion transmitting means comprises a pinion 5 in mesh with gear 135 and fixed at one end to a hub 6 freely rotatable on shaft 29, the other end of the hub has a pinion 7 attached thereto for meshing engagement with a one-tooth gear 8 fixed to an end of counter 33. Thus at the end of a revolution of counter 33, the one-tooth gear 8 will turn the step-by-step gear 135 through one tenth of a revolution, which movement causes detent 133 to step the counter 34 from one linear row of contacts to the next.

For resetting purposes, the two counter gears 125 and 131 are respectively in mesh with two unidirectional single position gears 136 and 137, which are freely rotatable on a reset shaft 138 and arranged to be driven respectively by pin 140 on gear 136 and a pin 141 on the gear 137, through the medium of fingers 142 and 144. The two fingers extend radially respectively from hubs 145 and 146 to intercept pins 140 and 141, the said hubs 145 and 146 being keyed to the resetting shaft 138. The drive for shaft 138 is through a gear 147 keyed thereon and in mesh with a gear 149 journalled on shaft 39, such gear 149 being driven by an idler gear from gear 20 which actuates the drum step-by-step indexing.

The shaft 21 of gear 20 is held against reverse turning by a wiper cam 150 keyed thereon and having a peripheral notch 151 seating the lower end of a pusher 152 mounted for sliding movement with its upper end beneath and bearing against a pivoted arm 153 when the pusher is in cam notch 151. The end of arm 153 lies beneath a lateral extension 154 of armature 52 as a support which maintains ledge 53 in the path of clutch pin 50 as the latter is cammed to release clutch disc 36. When reset solenoid 26 is energized, its armature arm 24 is withdrawn from pin 25 and friction clutch 22 rotates shaft 21 thereby causing the cam 150 to lift pusher 152 and swing arm 153 in the direction to mechanically retract armature 52 so that friction clutch 36 is free and the reset of counter 32 can take place.

In explaining the setting and operation of the system reference is made to Figs. 5 and 6 of the drawing wherein the former shows a developed surface of drum 10 and the latter a schematic circuit as assembled with the developed surfaces of the counters 32, 33 and 34.

Illustratively, a simple peg setting has been selected wherein for the first index position a peg is placed to close external switch B and pegs are placed in the time control end of the drum for 1 and 4 seconds (see Fig. 5) to maintain the switch closed for 5 seconds. Now when the drum is initially indexed to this position, switch B will be closed while the peg for one second will shift switch 78 and the four-second peg will shift switch 91. As counter 32 is indexed, the circuit to reset is from the source of voltage to brush terminal 65, and successively through counter contacts 60 through 63a without closing the resetting circuit because the transfer circuit to counter 33 is open by the pin set position of switch 78. However, after counter 32 has made one revolution, counter 33 moves one row thereby to bridge brush terminals 76 and 77 as contact 74 engages across the terminals. Current can now travel as far as brush terminal 89 but cannot go through to reset until counter 33 has turned to brush terminals 89 and 90 which then are bridged by the second counter contact 87a whereupon the complete reset circuit is closed to energize solenoid 26. This is because the current can flow through brush terminal 76, counter contact 74a, brush terminal 77, brush terminal 83, counter contact 80a, brush terminal 82, brush terminal 89, counter contact 87a, through brush terminal 90 and thence continue through all of the unset switches to energize reset solenoid 26. With the energizing of solenoid 26, armature 24 releases friction clutch disc 22 to rotate index gear 20 and turn drum 10 to its next position. With the release of clutch disc 22, cam 150 raises pusher 152 to shift armature 52 of timing solenoid 49 so that friction clutch 36 can return counter 32 to zero.

It is now seen that, as a unitary part of the system a drum having holes in the periphery serves to receive control pegs forming projections to actuate switches to control electrical circuits and time the sequence according to peg selection. Further precise program operation is achieved by providing an indexing mechanism which advances a rotatable drum from one detented position to the next when a timing circuit indicates the end of a time cycle.

Also the system includes a counting and comparison circuit which operates in response to a selected program by counting pulses from a contactor to compare the total count to the position of approximately ten switches actuated by a drum preset for predetermined sequence operation. By the system of the invention, ten switches make it possible to provide sequence steps of from ¼ second to 99¾ seconds in ¼ second intervals. It will be obvious that other numbers of switches can be used to code longer or shorter times. When the comparison circuit indicates equivalence between the counting circuit and the switch positions, the drum indexing circuit is energized and the counting circuit is returned to zero.

From the foregoing it will be apparent that a complete unitary sequence control system has been devised whereby sequential switching of any number of electrical circuits can be made according to a predetermined pattern and controlled as to time cycles by a related selecting system also preset for operation therewith.

What is claimed is:

1. Control apparatus comprising: a switch for connecting a mechanism to a source of electrical energy; means for actuating said switch to closed condition to effect operation of said mechanism; a time cycle control switch for timing the operation of said mechanism; means for actuating said timing switch; means including a time cycle adjusting switch in series with said timing switch for adjusting said time cycle, said cycle adjusting switch comprising a power input contact, two power output contacts, and a plurality of elements to effect bridging of pairs of said contacts, each pair including said input contact, and one of said output contacts; means for moving said elements successively to effect bridging of said contacts in selected pairs; and means to actuate said first mentioned switch to open condition at the end of a time cycle thus to halt the operation of said mechanism.

2. Control apparatus comprising: a switch for connecting a mechanism to a source of electrical energy; means for actuating said switch to closed condition to effect operation of said mechanism; a plurality of time cycle control switches for timing the operation of said mechanism; means for selectively actuating said timing switches; means including a plurality of time cycle adjusting switches alternately in series with said timing switches and cooperative with said time control switches to adjust said time cycle, each of said cycle adjusting switches comprising a power input contact, two power output contacts, and a plurality of elements to effect bridging of pairs of said contacts, each pair including said input contact, and one of said output contacts; means for moving said elements successively to effect such bridging of said contacts, and means operative to actuate said first mentioned switch to open condition thus to halt the operation of said mechanism at the termination of a predetermined time cycle determined by said timing and said time cycle adjusting switches.

3. Control apparatus comprising: a plurality of circuit controlling switches for connecting mechanisms to a source of electrical energy; means for selectively actuating said circuit switches to effect operation of said mechanisms; a plurality of time cycle control switches operable to permutations of positions for timing the operation of said mechanisms; means for selectively actuating said timing switches; a plurality of time cycle adjusting switches alternately in series with said timing switches and cooperating therewith to select different time cycles of operation of said mechanisms, each of said cycle adjusting switches comprising a power input contact, two power output contacts, and a plurality of elements to effect bridging of said contacts in pairs, each pair including said input contact, and one of said output contacts; means for moving said elements to effect successive bridging of pairs of said contacts; and means operative at the termination of a selected time cycle to actuate selected of said circuit and said time cycle controlling switches.

4. Control apparatus comprising: a plurality of circuit controlling switches for connecting mechanisms to a source of electrical energy; means for selectively and successively actuating said circuit switches to closed condition to effect successive operation of selected of said mechanisms; a plurality of single pole double throw time cycle control switches operable to different conditions for timing the operation of said mechanism; means for selectively actuating said timing switches; a plurality of time cycle adjusting switches alternately in series with said timing switches and cooperating therewith to select different time cycles of operation of said mechanisms, each of said cycle adjusting switches comprising a power input contact, two power output contacts, and a plurality of elements to effect bridging of said contacts in pairs, each pair including said input contact, and one of said output contacts; means for moving said elements to effect bridging of said contacts in successive pairs; and means operative at the termination of one time cycle to terminate the operation of the selected mechanism and initiate operation of others.

5. Sequence control apparatus comprising; a plurality of circuit controlling switches for connecting mechanisms in sequence to a source of electrical energy; means for selectively actuating said switches for effecting sequential operation of said mechanisms; a plurality of single-pole, double throw time cycle control switches each operable between first and second conditions for timing the operation of said mechanisms in predetermined time cycles; means operative simultaneously with said circuit control switch actuating means for selectively actuating said timing switches from one condition to another thereby to change a time cycle; a plurality of time cycle adjusting switches alternately in series circuit with said timing switches, each of said cycle adjusting switches comprising a power input contact, two power output contacts, and a plurality of elements to effect bridging of said contacts in pairs, each pair including said input contact and one of said output contacts, said cycle adjusting switches being normally conditioned in closed series circuit with said timing switches when the latter are in one of said conditions; and means for moving said elements successively to effect bridging of said contacts in selected pairs effective to place said timing and said cycle adjusting switches in series circuit after a predetermined time cycle determined by actuation of selected timing switches to the other of said conditions thereby to terminate said time cycle.

6. Sequence control apparatus comprising: a plurality of circuit controlling switches for connecting mechanisms in sequence to a source of electrical energy; stepping means for selectively actuating said switches for effecting sequential operation of said mechanisms; a plurality of single-pole, double throw time cycle control switches each operable between first and second conditions for timing the operation of said mechanisms in predetermined time cycles; means operative simultaneously with said stepping means for selectively actuating said timing switches from one condition to another thereby to change a time cycle; a plurality of stepping switches alternately in series circuit with said timing switches, each of said stepping switches comprising a power input contact, two power output contacts, and a plurality of elements to effect bridging of said contacts in pairs, each pair including said input contact and one of said output contacts, said stepping switches being normally conditioned in closed series circuit with said timing switches when the latter are in one of said conditions; means for stepping said elements successively to effect bridging of said contacts in selected pairs effective to place said timing and said stepping switches in series circuit after a predetermined time cycle determined by actuation of selected timing switches to the other of said conditions thereby to terminate said time cycle; and means effective at the termination of a selected time cycle to actuate said stepping means to initiate a new cycle of operation.

7. Sequence control apparatus comprising; a plurality of circuit controlling switches for connecting mechanisms in sequence to a source of electrical energy; stepping means for selectively actuating the said switches for effecting sequential operation of said mechanisms; a plurality of single-pole, double throw timing control switches each operable between first and second conditions for timing the operation of said mechanisms in predetermined time cycles; means operative simultaneously with said stepping means for selectively actuating said timing switches from one condition to another thereby to change a time cycle; a plurality of stepping switches alternately in series circuit with said timing switches, each of said stepping switches comprising a fixed power input contact, two fixed power output contacts, and a plurality of movable elements having a starting position and being movable to effect bridging of said contacts in pairs, each pair including said input contact and one of said output contacts, said stepping switches being normally conditioned in closed series circuit with said timing switches when the latter are in one of said conditions; means for stepping said elements successively to effect bridging of said contacts in selected pairs effective to place said timing and said stepping switches in series circuit after a predetermined time cycle determined by actuation of selected timing switches to the other of said conditions thereby to terminate said time cycle; means effective at the termination of a selected time cycle to actuate said stepping means to initiate a new cycle of operation; and means for resetting said element stepping means to its starting position.

8. Sequence control apparatus in accordance with claim 7 wherein said means for actuating said circuit controlling switches, and said means for actuating said timing switches includes a rotatable drum having means adjustably positioned on one area of its outer surface selectively to actuate said circuit controlling switches, and means adjustably positioned on another area of its outer surface selectively to actuate said timing switches.

9. Sequence control apparatus in accordance with claim 7 wherein the fixed contacts of said stepping switches comprise brushes, and said movable elements comprise conductive areas on the surfaces of rotatable drums.

10. Apparatus according to claim 9 and wherein said conductive surfaces are arranged in circumferentially disposed pairs of rows in accordance with a binary pattern.

11. Apparatus in accordance with claim 10 and including means for rotating said element carrying drums in steps at timed intervals.

12. A sequence control system, comprising the combination of a plurality of switches for respectively controlling electric circuits of operating instrumentalities, time counting means having a starting position, a rotatable element, step-by-step means for operating said element, means on the surface of said element for selectively operating said switches as said element turns, means predeterminedly arrangeable on said element to set said counter means for selected time cycles, means for actuating said counter means, means operating at the end of a time cycle for actuating said step-by-step means to turn said element to a new switch time cycle position, and means for resetting said counting means to said starting position.

13. A sequence control system according to claim 12, wherein said switch selection means and said counter setting means are in different areas on the surface of said element.

14. A sequence control system according to claim 12, wherein said counter actuating means includes a timed pulse unit.

15. A sequence control system according to claim 12, wherein said time counting means includes a cylinder having a circumferential time contact pattern thereon, and a plurality of switch controller circuits having terminals selectively closed by said counter pattern.

16. A sequence control system, comprising the combination of a plurality of switches for controlling electric circuits of operating instrumentalities, time counting means having a starting position, a rotatable drum, step-by-step means for operating said drum, means insertable in the surface of said drum at one area thereon to project from said surface for selective operation of said switches as said drum turns, means insertable in said drum at another location to project from the surface thereof to set said counter means for a selected time cycle, means operating at the end of a time cycle for actuating said step-by-step means to turn said drum to a new switch time cycle position, and means for resetting said counting means to said starting position.

17. A sequence control system, comprising the combination of a plurality of switches for controlling electric circuits of operating instrumentalities, a rotatable drum having prearranged holes in the surface thereof, pegs insertable in selected ones of said holes to operate certain of said switches in one time index position as said drum turns, a plurality of time controller circuits, a time switch for closing each circuit, pegs insertable in other of said holes in said drum to control selected ones of said time circuit switches, a rotatable time counter having a starting position means including contacts circumferentially arranged on the periphery of said counter in selected time intervals for closing any circuit selected by a time switch setting, means including a timing unit for turning said counter at predetermined constant time intervals, means for turning said drum to another index position at the end of one time cycle, and means for resetting said counter to said starting position.

18. A sequence control system according to claim 17 wherein there are a plurality of rotatable time counters for contact closing, and means for rotating the counters at successively increasing time intervals.

19. A sequence control system according to claim 17 wherein the resetting means includes a solenoid common to all of said circuits.

20. A sequence control system according to claim 17, wherein, said counter turning means includes a unidirectional clutch.

21. A sequence control system according to claim 17 wherein said resetting means includes a unidirectional clutch and means holding said clutch operative while said counter rotates.

22. A sequence control system, comprising a plurality of rotatable counters, means including a unidirectional clutch for rotating one of said counters, solenoid controlled means for holding said clutch inoperative, time pulse means for energizing said solenoid to release said clutch at predetermined time intervals to turn said clutch coupled counter, means to transfer the end of one revolution of said counter to turn a second counter one time interval, rows of brush terminals respectively mounted adjacent said counters, an electric timing circuit including said terminals, a plurality of normally closed switches in said circuits, a rotatable drum, means on the surface of said drum for actuating one or more of said switches to open circuit condition, contacts arranged about the surface of all counters in a predetermined pattern to effect bridging of certain of said brush terminals to close said circuit after a predetermined time interval, means to turn said drum step by step from one time position to another, and means on the surface of said drum for selecting one or more external circuits to be controlled by said timing circuit.

No references cited.